United States Patent [19]

Galpern

[11] Patent Number: 5,111,407
[45] Date of Patent: May 5, 1992

[54] SYSTEM FOR MEASURING AND RECORDING A UTILITY CONSUMPTION

[75] Inventor: Natan Galpern, Hevel Megido, Israel
[73] Assignee: Arad Ltd., Kibbutz Daliah, Israel
[21] Appl. No.: 570,216
[22] Filed: Aug. 21, 1990

[30] Foreign Application Priority Data

Aug. 25, 1989 [IL] Israel .......................................... 91439

[51] Int. Cl.⁵ ........................ G06F 15/56; G06F 15/74
[52] U.S. Cl. ............................... 364/483; 340/870.02; 364/550
[58] Field of Search ................ 364/481, 483, 550, 480, 364/464.04; 340/870.02, 870.31, 825.15, 637; 324/113, 116

[56] References Cited

U.S. PATENT DOCUMENTS

| | | | |
|---|---|---|---|
| 3,705,385 | 12/1972 | Batz | 340/870.02 |
| 4,213,119 | 7/1980 | Ward et al. | 340/870.02 |
| 4,291,375 | 9/1981 | Wolf | 364/464.04 X |
| 4,542,469 | 9/1985 | Brandyberry et al. | 364/483 |
| 4,652,877 | 3/1987 | Gray | 364/483 X |
| 4,701,698 | 10/1987 | Karlsson et al. | 364/483 X |
| 4,757,456 | 7/1988 | Benghiat | 364/464.04 |
| 4,803,632 | 2/1989 | Frew et al. | 364/483 X |
| 4,833,618 | 5/1989 | Verma et al. | 364/483 |
| 4,998,024 | 3/1991 | Kirk et al. | 364/483 X |

*Primary Examiner*—Kevin J. Teska
*Attorney, Agent, or Firm*—Helfgott & Karas

[57] ABSTRACT

A system for measuring and recording a utility consumption such as water, for example. A mechanical meter measures and displays the utility consumption in conventional manner and also produces an electrical pulse representative of an increment thereof. A sealed electronic module is attached to the meter and is inductively coupled thereto so that a computer in the sealed module can count the pulses and thereby compute the utility consumption. A memory within the sealed module stores the computed utility consumption which should be identical to the metered consumption and also stores an identification code characteristic of the meter. An interrogation unit is r.f. coupled to one or a plurality of such sealed modules via suitable antennas so as to read the memories therein and to write to the memories, as required. In the event that a meter is faulty, only the meter itself need be replaced and the data stored in the corresponding sealed module can be updated in the field by a portable interrogation unit so as to conform the identification code and the computed utility consumption stored therein to those associated with the replacement meter.

11 Claims, 5 Drawing Sheets

SYSTEM FOR MEASURING AND RECORDING A UTILITY CONSUMPTION

FIELD OF THE INVENTION

This invention relates to meter data-gathering systems for public service utilities.

BACKGROUND OF THE INVENTION

Owing to the inconvenience and high cost of sending personnel to subscribers' residences in order to collect consumption data for public service utilities, such as water, electricity and gas, it is known to employ electronic metering devices and to collect the data remotely using computerized data-gathering systems. Typically, such computerized data-gathering systems comprise an electronic metering device coupled to a memory which stores a unique access number associated with the electronic metering device together with data corresponding to the consumption of the measured utility.

U.S. Pat. No. 4,652,877 discloses a utility data-gathering system which comprises a standard meter mechanism displaying a digital read-out and coupled to an electronic circuit responsive to the rotation of a shaft within the mechanism so as to convert the mechanical reading to an electronic signal. In such a system, if the electronic circuit becomes inoperative for any reason, such as, for example, a power failure, the mechanism continues to function correctly and the mechanical digital reading provides a back-up of the measured consumption. Utility meters of this kind are commonly used in electronic data-gathering systems with which the present invention is concerned.

U.S. Pat. No. 4,132,981 discloses a system for interrogating and recording a customer's consumption of a utility so as to facilitate automatic invoicing. The system comprises two parts: a computer coupled to an electronic utility meter and a portable interrogation unit including a memory, which is carried by a "meter reader" to each customer location. In response to a suitable interrogation signal, the interrogation unit transmits a signal to the computer which responds by transmitting to the interrogation unit a digital signal corresponding to the utility consumption data stored therein. Such a system permits the meter reader to read the contents of the computer directly so as to record within the interrogation unit the vital statistics of a customer's consumption including, for example, a customer identification number, a meter identification number and a consumption reading.

It is also known for the interrogation unit to include a hand-held computer which is programmed to prepare an invoice automatically which can then be transmitted, via a suitable modem, to a central computer within the utility supply company's billing department.

A drawback with the above system is its inherent lack of flexibility when the meter itself is faulty. It is standard practice to provide with electronic meters some form of integrity check which checks the functionality of the meter. Thus, in the event of a power failure, for example, an error flag is set within the computer which permits ready identification to the meter reader of the fact that the stored reading is inaccurate. Under these circumstances, he must then manually read the mechanical output and enter this into the hand-held computer. Clearly, the electronic reading within the computer must then be updated so as to correlate it with the mechanical reading and this task has hitherto been undertaken by the technical services department of the utility supply company, it having been so far impossible for the meter reader himself to perform this task.

A similar problem occurs when a faulty meter is encountered which needs to be replaced. The meter identification number must be programmed into the computer and, in hitherto proposed systems, the means for doing this have been denied to the meter reader, thereby requiring a separate visit by a member of the technical services department.

SUMMARY OF THE INVENTION

It is an object of the invention to provide an improved system for measuring and recording a utility consumption, in which the drawbacks associated with hitherto proposed systems are substantially reduced or eliminated.

According to the invention there is provided a system for measuring and recording a utility consumption, said system comprising a data-gathering system and an interrogation unit;

the data-gathering system including:

a meter having a unique identification code for measuring and displaying a metered utility consumption and producing successive electrical pulses representative of an increment thereof, a sealed electronic module removably fixed to the meter and comprising:

a first computer electrically coupled to the meter and responsive to the electrical pulses produced thereby for computing a utility consumption, a memory coupled to the first computer for storing data representative of said computed utility consumption and of said unique identification code, a first bi-directional data converter coupled to the first computer for converting in one direction said data to a representative r.f. signal and for converting in the second direction an r.f. signal to representative digital data, a first wideband coil antenna coupled to the data converter for transmitting and receiving an r.f. signal; and a power source for providing electrical power to the sealed electronic module; and the interrogation unit including:

a non-contact portable communications interface for coupling the data-gathering system to a second computer so as to permit the second computer to read data stored in the memory of the data gathering unit and to write data thereto thereby allowing the computed utility consumption to be conformed to the metered utility consumption; said non-contact portable communications interface comprising:

a second wideband coil antenna for communicating with the first coil antenna by mutual coupling, a second bi-directional data converter coupled to the second antenna for converting in one direction a received r.f. signal to digital output data and for converting in a second direction digital input data to an r.f. output signal and being further provided with coupling means for coupling to the second computer, and a power source for providing electrical power to the interrogation unit.

Thus, according to the invention, there is provided an interface which permits coupling of an interrogation unit to the first computer within the data-gathering system so as to read data stored therein and also to permit a meter reader to transmit information thereto. By this means, the electronic data stored within the system computer can be updated, if required, by the meter reader himself without his having to resort to sending out specialized personnel. Furthermore, a faulty meter can be replaced by the meter reader and the meter identification number reprogrammed within the system computer by means of a hand-held computer coupled to the system computer via the interface according to the invention.

The use of a wideband coil antenna ensures that data transmission is substantially independent of frequency, unlike many known non-contact responder-interrogator systems which employ resonant tuned circuits which are highly sensitive to the resonant frequency.

BRIEF DESCRIPTION OF THE DRAWINGS

The invention will now be described with regard to a system for local reading and programming of a water meter, by way of non-limiting example only, and with reference to the accompanying drawings, in which.

DETAILED DESCRIPTION OF A PREFERRED EMBODIMENT

Figure 1:
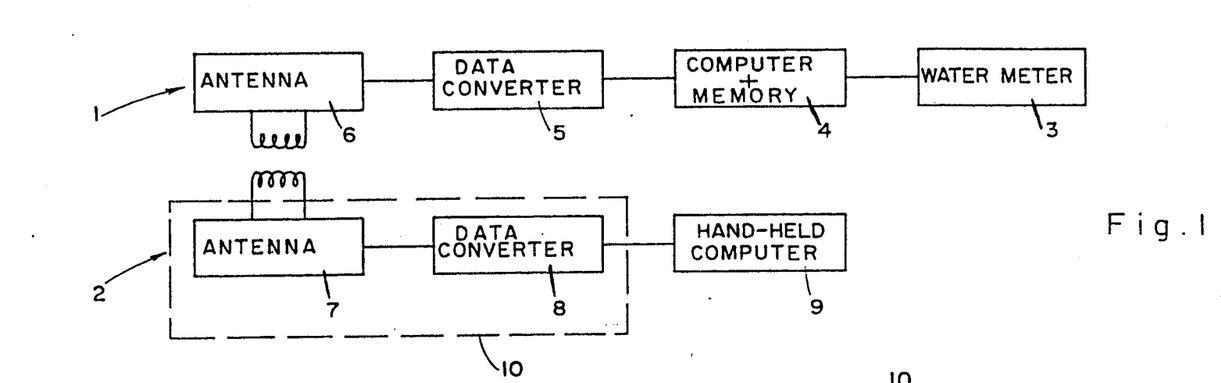
FIG. 1 is a block diagram showing schematically a system according to the invention.

Referring to FIG. 1, there is shown a data-gathering system depicted generally as 1 for measuring a consumer's water consumption and a portable interrogation unit 2 for use therewith. The data-gathering system 1 comprises a water meter 3 adapted to produce an electronic signal and a computer 4 coupled to the water meter. The computer 4 is constituted by means of a micro-controller containing a memory (see FIG. 3) for storing data corresponding to the water meter output. Also recorded within the computer 4 is a code which uniquely identifies the water meter 3, together with any other data which is required to be stored therewith.

A bi-directional data converter 5 is coupled to the computer 4 and is adapted, in one direction, to read the contents of the computer 4 and to convert the digital data stored therein to a r.f. signal which is then transmitted to the interrogation unit 2 via an antenna 6 coupled to the data converter 5. In the other direction, the data converter 5 is adapted to read a r.f. signal received by the antenna 6 and to convert it to a digital signal for storing in the computer 4.

The interrogation unit 2 likewise includes a coil antenna 7 for coupling to the antenna 6 of the data-gathering system 1. The antenna 7 is also coupled to a bi-directional data converter 8 which functions in a similar manner to the data converter 5 of the data-gathering system 1. The bi-directional data converter 8 is adapted to be coupled to a hand-held computer 9. The antenna 7 together with the bi-directional data converter 8 constitute an interface 10 which permits the hand-held computer 9 to be coupled to the data-gathering system 1 so as to read data stored within the computer 4 and also to update the contents of the computer 4, as required.

Figure 2:
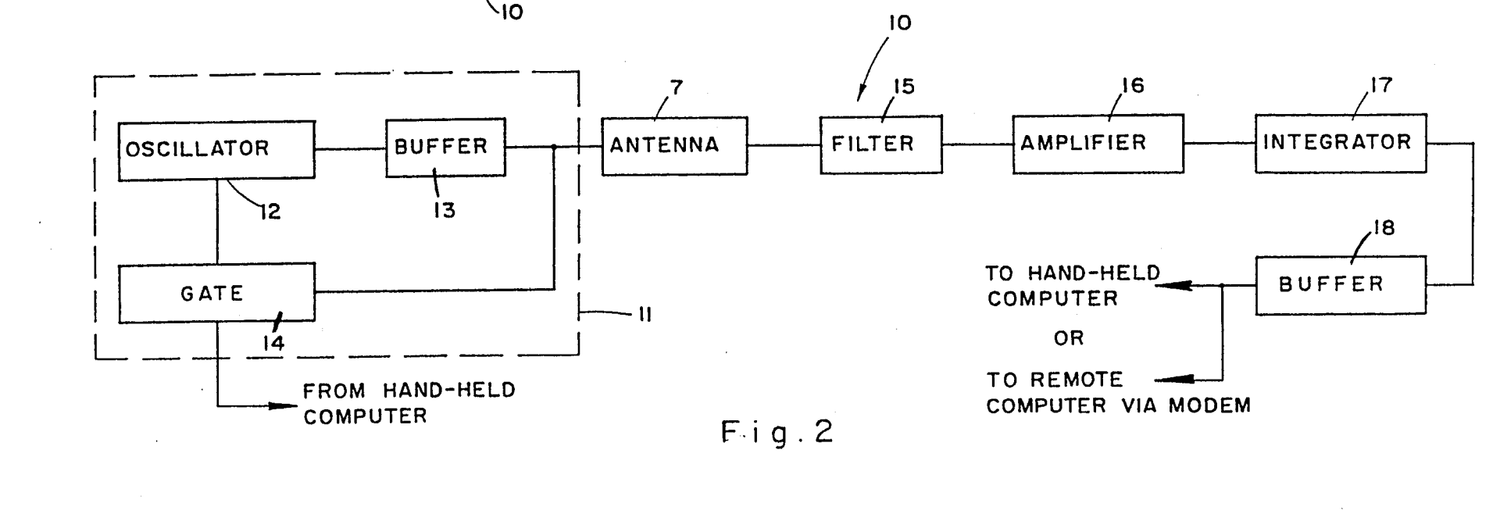
FIG. 2 is a block diagram showing schematically an interface for use with the system shown in FIG. 1.

FIG. 2 shows schematically the functional units associated with the interface 10. Coupled to the antenna 7 is a transmitter 11 which comprises a 150 KHz oscillator 12 coupled to a buffer 13 whose output is coupled to the antenna 7. The buffer 13 ensures that a sufficiently strong signal from the oscillator 12 is passed to the antenna 7. The transmitter 11 further includes a gate circuit 14 which activates the oscillator 12 in order to allow the r.f. signal produced by the oscillator 12 to pass to the antenna 7.

The signal received by the antenna 7 is filtered by a high pass filter 15 coupled thereto and is then amplified by an amplifier 16. Coupled to the amplifier 16 is an integrator 17 which integrates the amplified signal at the output of the amplifier 16 and the integrated signal is then fed directly to a suitable hand-held computer (not shown) via a suitable buffer 18.

Figure 3:
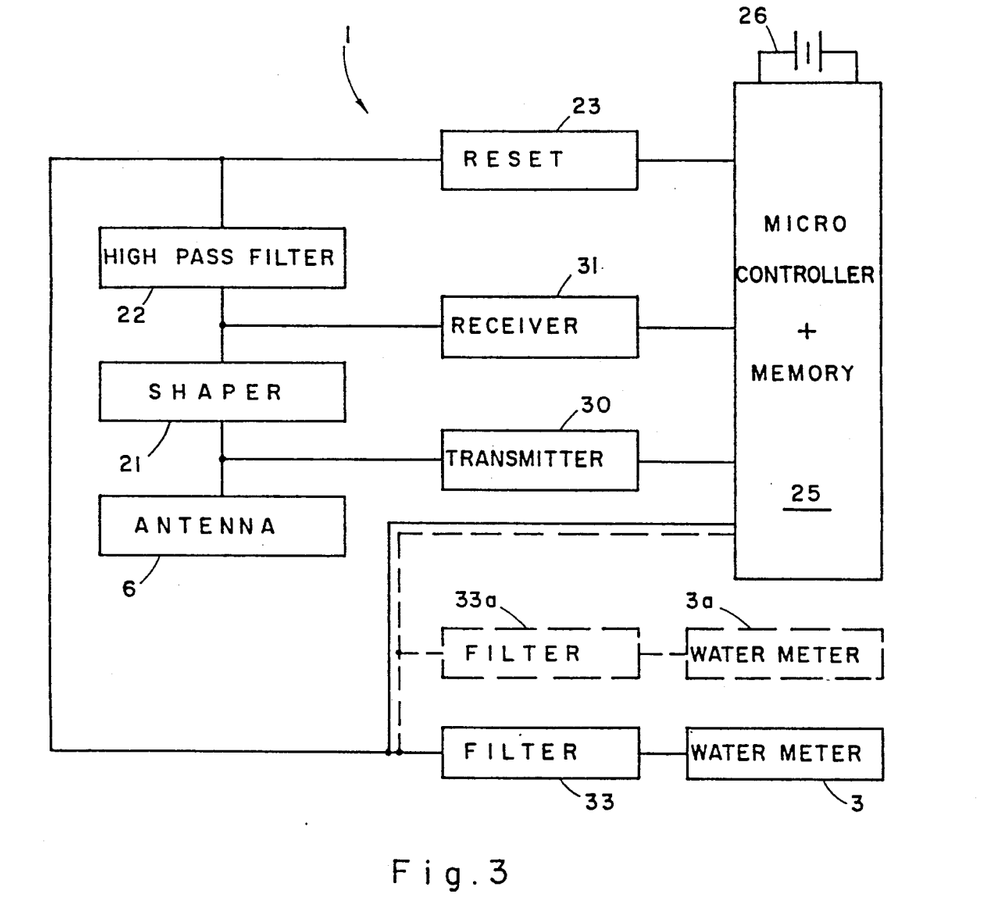
FIG. 3 shows a data-gathering system for use with the system shown in FIG. 1.

Referring to FIG. 3, there is shown schematically the functional units associated with the data-gathering system 1 shown in FIG. 1. As was explained above, the data-gathering system 1 is adapted both to receive and to transmit information. Considering first the receiving mode, the antenna 6 is coupled to a wave shaper 21 which converts the r.f. signal received by the antenna 6 to a square wave pulse train. This pulse train is fed to a high pass filter 22 coupled to the wave shaper 21 and designed to pass only those signals whose frequencies exceed a predetermined threshold of 30 KHz. The r.f. signal which is passed by the high pass filter 22 is fed to a reset circuit 23 coupled to a micro-controller 25. The reset circuit 23 is responsive to a first portion of the received r.f. signal so as to reset the micro-controller 25 which then transmits data responsive to a second portion of the received r.f. signal. The micro-controller 25 receives clock signals from a quartz crystal 26.

An output port of the micro-controller 25 is connected to a transmitter 30 whose output is connected to the antenna 6. Similarly, a receiver 31 is connected at its output to an input port of the micro-controller 25 and at its input to the output from the wave shaper 21.

In the arrangement shown in FIG. 3, provision is made for coupling two water meters 3 and 3a to suitable input ports of the micro-controller 25 via corresponding filter circuits 33 and 33a.

The operation of the circuit will now be explained with reference to the water meter 3. The digital electronic signal generated by the water meter 3 is filtered by the filter circuit 33 and the resulting square wave pulses are counted by the micro-controller 25 so as to store therein data corresponding to the water consumption measured by the water meter 3.

When a meter reader desires to record or reprogram the data-gathering unit 1, he transmits an 8-byte signal via the interrogation unit 2 in accordance with a predetermined protocol. The signal is received by the antenna 6 and subsequently passes via the wave shaper 21 and the high pass filter 22 to the reset circuit 23. The reset circuit 23 is responsive to the first byte of the received signal and resets the micro-controller 25 which is programmed to respond to subsequent bytes of the received signal so as to transmit via the transmitter 30 an 8-byte data signal in accordance with the predetermined protocol. The signal generated by the transmitter 30 is transmitted by the antenna 6 and is picked up by the antenna 7 in the interrogation unit 2.

Figure 4:
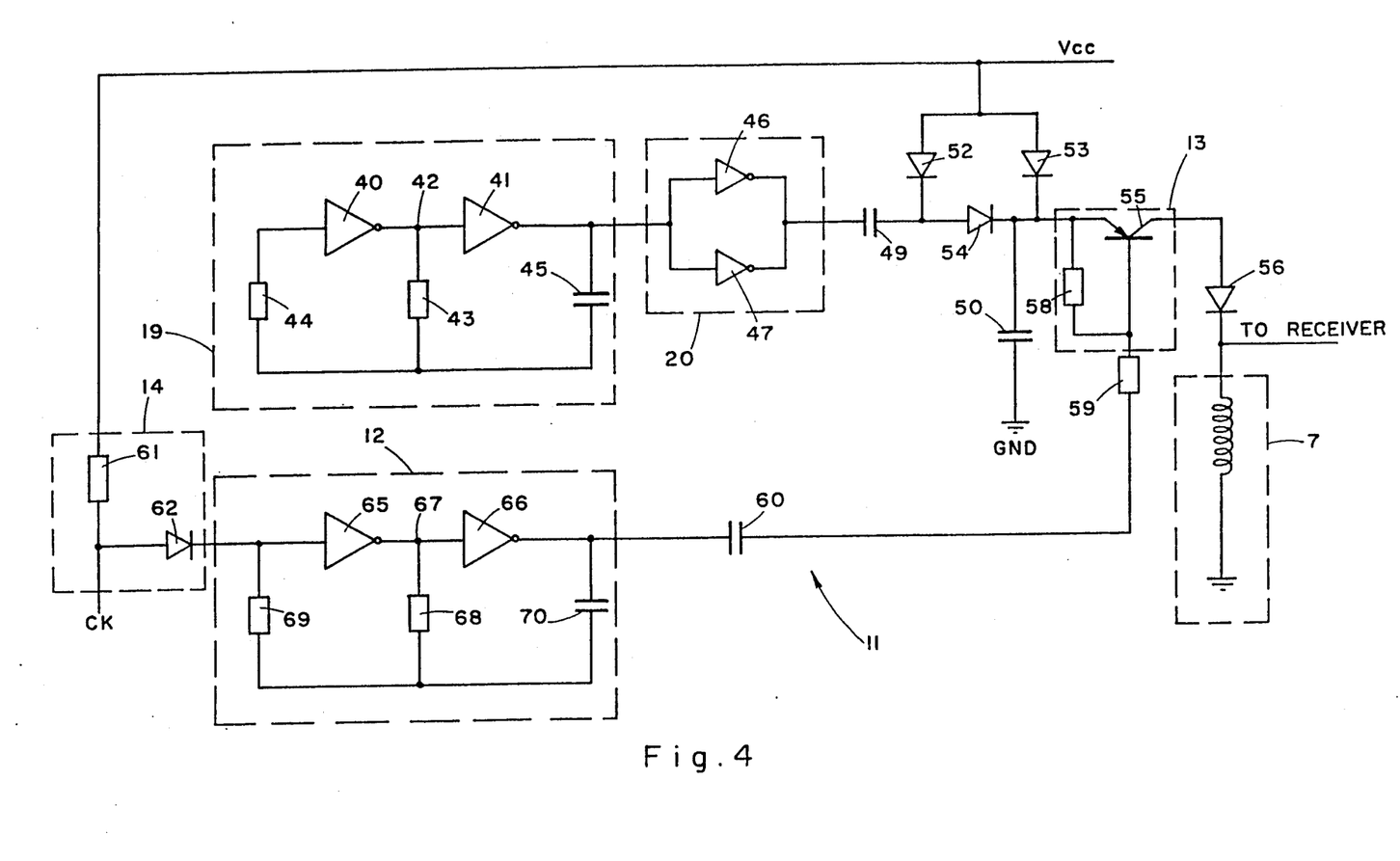
FIG. 4 is a circuit diagram showing a detail of a transmitter for use with the interface shown schematically in FIG. 2.

FIG. 4 shows schematically a circuit diagram of the main components of the transmitter 11 shown in FIG. 2. There is provided an oscillator 19 which includes two integrated circuit inverters 40 and 41 connected in cascade, their common junction 42 being connected to one end of a resistor 43. The other end of the resistor 43 is connected via a resistor 44 to the input of the inverter 40 and also via a capacitor 45 to the output of the inverter 41.

The output of the inverter 41 is fed to the input of a buffer 20 which comprises two inverters 46 and 47 connected in parallel. The output from the buffer 20 is fed to a voltage multiplier comprising capacitors 49 and 50 and rectifier diodes 52, 53 and 54. The anodes of the rectifiers 52 and 53 are commonly connected to the positive supply rail Vcc, their cathodes being connected, respectively, to the anode and cathode of the rectifier 54. The common cathodes of the rectifier diodes 53 and 54 are fed via the capacitor 50 to ground, GND.

The un-grounded terminal of the capacitor 50 is fed to the emitter terminal of a bipolar junction transistor 55 whose collector is fed via a rectifier diode 56 to the antenna 7. The transistor 55 is biased by means of a resistor 58 connected between its base and emitter so that it is in the cutoff region when the oscillator 12 is disabled. The base of the transistor 55 is connected to the oscillator circuit 12 via a resistor 59 and capacitor 60 connected in series. The oscillator 12 is connected to the positive supply rail Vcc via a pull-up resistor 61 connected to a rectifier diode 62, which together constitute the gate circuit 14.

The oscillator 12 comprises two inverters 65 and 66 connected in cascade, their common terminal 67 being connected to one end of a resistor 68. The other end of the resistor 68 is connected via a resistor 69 to the input of the inverter 65 and also via a capacitor 70 to the output of the inverter 66.

The operation of the circuit will now be described. The voltage appearing across the capacitor 49 varies between Vcc and 0 in accordance with the output of the oscillator 19 and the buffer 20. Thus, when the output of the buffer circuit is LOW, the voltage appearing at the common terminal of the capacitor 49 and the diode 54 is equal to Vcc−0.7, 0.7 being the forward bias voltage of the diode 52. When the voltage appearing at the output of the buffer 20 climbs to Vcc, this voltage is superimposed on the output of the capacitor 49, which consequently climbs to 2Vcc−0.7. The forward bias voltage of the rectifier diode 54 is also equal to 0.7 and, therefore, the steady-state voltage appearing across the capacitor 50 is 2(Vcc−0.7).

A gate CK is applied to the junction of the resistor 61 and the diode 62. When the level of CK is HIGH, the input to the inverter 65 is HIGH and its output is therefore LOW. Consequently, the output of the inverter 66 is also HIGH, the oscillator 12 is disabled and the transistor 55 is cutoff. The positive supply rail Vcc is equal to 5 V.

When the gate CK is LOW, the oscillator 12 is enabled and consequently the base voltage of the transistor 55 varies between LOW and HIGH at the frequency of the oscillator 12. Under these circumstances, the transistor 55 switches from cutoff to saturation at the frequency of the oscillator 12, and its collector current varies between LOW and HIGH at the same frequency.

The collector current is passed via the diode 56 to the antenna 7 and consequently the current passing through the antenna 7 is subjected to rapid interruption at the frequency of the oscillator 12. Each time the current through the antenna 7 is interrupted, there is generated across its terminals a back e.m.f. given by:

$$E = -L\,di/dt$$

where:
- E is the magnitude of the back e.m.f.,
- L is the inductance of the coil antenna 7, and
- di/dt is the rate of change of collector current. Since the frequency of the collector current is very high, di/dt is correspondingly large and the magnitude of the back e.m.f. E is many times greater than Vcc, typically 70 V.

Thus, the action of the gate CK going LOW causes the transistor 55 to switch from cutoff to saturation, and vice versa, at the oscillator frequency and enables the transmission of the transistor collector current via the antenna 7. Likewise, when the gate CK goes HIGH, the r.f. oscillator is interrupted and the transistor 55 is cutoff. Consequently, the transistor 55 functions as the buffer 13 shown in FIG. 2. While receiving, the voltage on the antenna 7 greatly exceeds the reverse base-collector breakdown voltage $V_{BC}$ of the transistor 55 and is prevented from reaching the collector by means of the diode 56.

Figure 5:
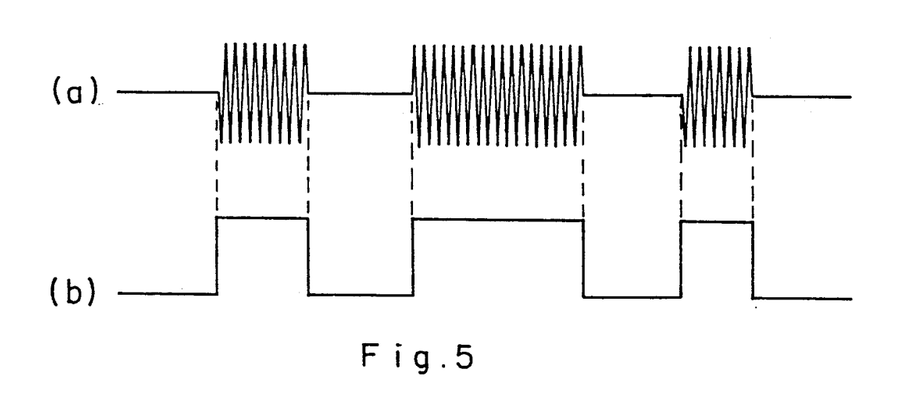
FIG. 5 shows pictorially typical analogue and digital waveforms associated with the system shown in FIG. 1.

In FIG. 5(a), there is shown a typical waveform appearing at the output of the antenna 7, responsive to data being transmitted to the interrogation unit 2 by the data-gathering system 1. Thus, the r.f. signal received by the antenna 7 consists of bursts of a high frequency waveform, each burst corresponding to digital data comprising one or more binary 1 bits.

The waveform shown in FIG. 5(b) represents the output from the integrator 17 shown in FIG. 2, which converts the bursts of r.f. signal data shown in FIG. 5(a) to a square wave pulse train having a predetermined HIGH voltage level corresponding to the presence of r.f. signal data and a LOW voltage level, otherwise. Clearly, reverse logic can equally well be employed, the integrator output being LOW in response to the presence of r.f. signal data and HIGH, otherwise.

The waveforms shown in FIGS. 5(a) ad 5(b) permit data received by the antenna 7 in the interrogation unit 2 to be converted to a digital form suitable for processing by the hand-held computer (not shown) connected to the interface 10. Thus, when an instruction is transmitted to the micro-controller 25 (FIG. 3), the contents of its memory are transmitted as a r.f. signal as shown in FIG. 5(a) by the antenna 6 and is received by the antenna 7 in the interrogation unit 2. After filtering, amplification and integration, a digital signal as shown in FIG. 5(b) is fed to the hand-held computer, which is thus able to read the contents of the computer 4 in the data-gathering system 1 and post-process the received data in accordance with a predetermined program stored within the hand-held computer.

Likewise, when it is desired to modify data stored within the computer 4 of the data-gathering system 1, the required data is transmitted via the antenna 7 of the interrogation unit 2 by means of varying the level of the gate CK. As has been explained in detail with reference to FIG. 4, the resultant r.f. signal output is transmitted via the antenna 7 and is received by the antenna 6 of the data-gathering system 1. The received r.f. signal is shaped by the wave shaper 21 and passed to the receiver 31 in order to extract the original digital waveform, which is passed to the micro-controller 25.

Figure 6A:
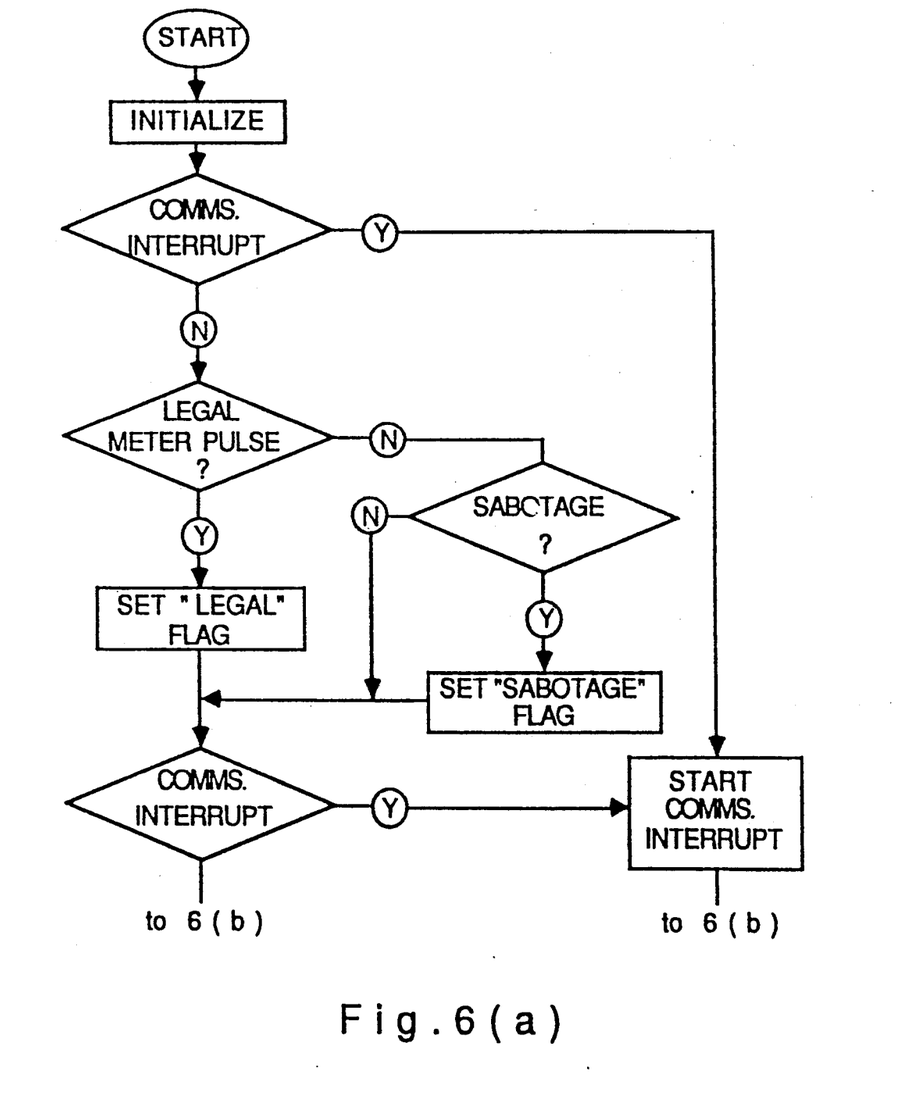
FIGS. 6a and 6b are flow diagrams showing schematically a program for operating the data-gathering system shown in FIG. 3.
Figure 6B:
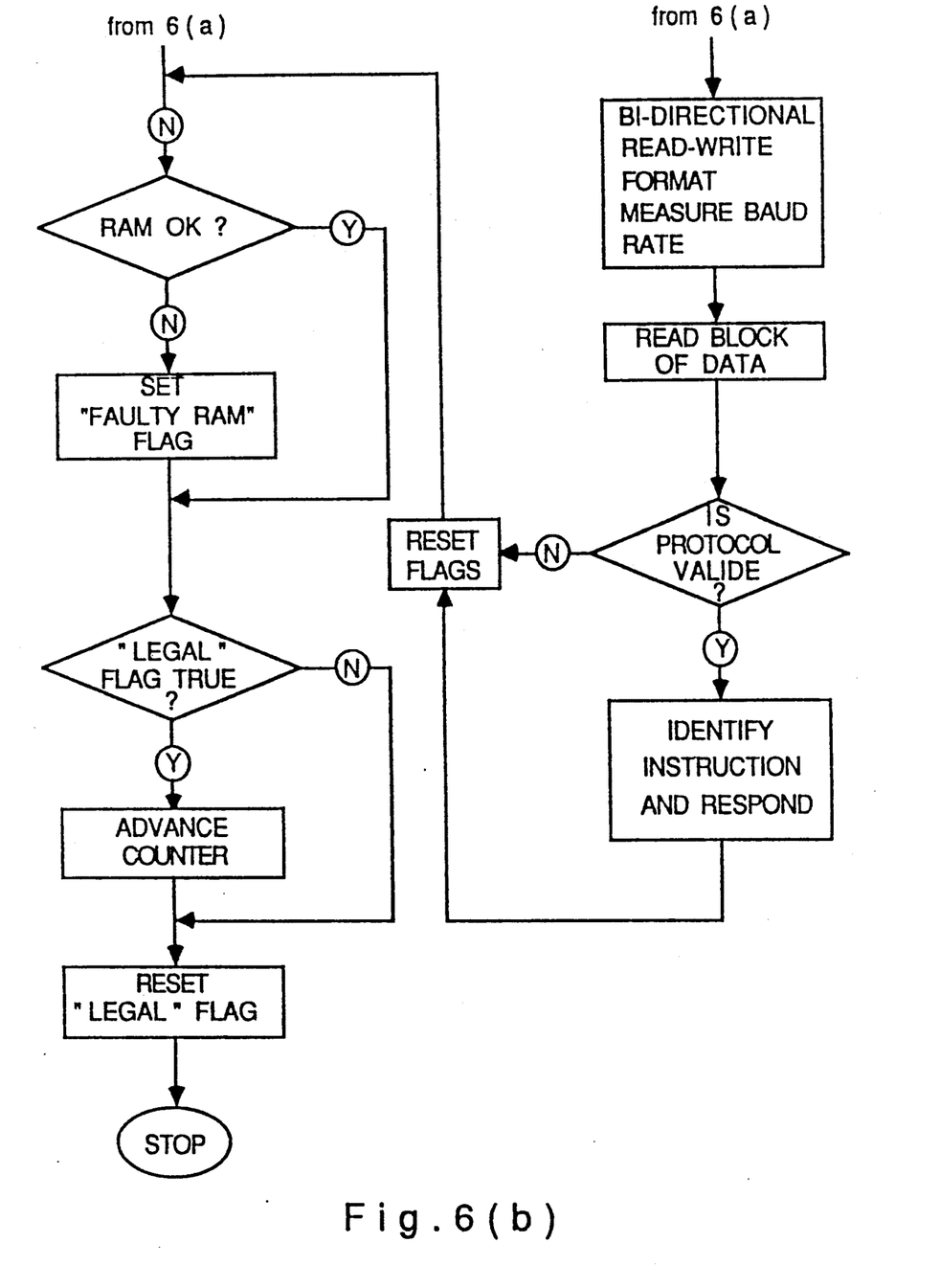

Referring now to FIGS. 6a and 6b of the drawings, there is shown a flow diagram of a program for operating the micro-controller 25.

When an interrupt is applied to the data-gathering system 1, the micro-controller 25 is initialized and checks for the presence or absence of the communications interrupt. A communications interrupt is produced whenever the interrogation unit 2 transmits data to the data-gathering system 1 in order to record or reprogram the data-gathering unit 1. Thus, the presence of a communications interrupt causes the micro-controller 25 to initiate a set of instructions for permitting bi-directional communication between the data-gathering unit 1 and the interrogation unit 2.

In the event that the micro-controller 25 detects no communications interrupt, then an incoming signal is checked in order to establish whether or not it constitutes a legal pulse. A "legal" pulse is generated by the water meter 3 responsive to a predetermined flow of water therethrough, such that the number of legal pulses counted within a given period of time is indicative of the cumulative water consumption within that time period. However, "legal" pulses are not counted directly on their detection but, rather, a "LEGAL" status flag is set by means of which the cumulative number of pulses counted so far may be incremented at a later stage.

In the event that an incoming pulse is not legal, it may be due to sabotage or, alternatively, may simply be noise on the line. By "sabotage" is meant an unauthorized attempt to slow down the rate of measurement by tampering with the water meter 3 so that it gives a false, low reading. There exist several different approaches to interfering with the integrity of flow-rate meters which result in a pulse being generated which may be distinguished from a legal pulse. In the event of sabotage, a "SABOTAGE" flag is set so as to inform the meter reader of attempted sabotage or fraud when the data-gathering unit 1 is next interrogated.

In a preferred embodiment, a "legal" pulse is constituted by a pulse whose duration is longer than a predetermined time period. To this end, the pulses generated by the water meter 3 are fed to a one-shot multivibrator which changes state for a predetermined time period. The level of the pulse produced by the water meter 3 is checked periodically throughout the time that the multivibrator level has changed state. If the pulse produced by the water meter 3 were due to noise, the resulting signal will last for only a relatively short period of time and no signal will be detected from the water meter 3 toward the end of the multivibrator time period. On the other hand a genuine water meter 3 pulse will last for a sufficiently long period of time to be detected even towards the end of the time period that the multivibrator is active. In this manner a "legal" pulse may be differentiated from an "illegal" pulse.

After a check for sabotage has been effected and also after the pulse flag has been set to "LEGAL", a further check for a communications interrupt is effected permitting the micro-controller 25 to initiate communications between the interrogator 2 and the data-gathering unit 1, if required. If, in fact, no communications interrupt is present, a routine is initiated for checking the integrity of the random access memory (RAM) associated with the micro-controller 25. If the RAM is found to be faulty, a "FAULTY RAM" flag is set. Thereafter, the status of the "LEGAL" flag is tested and, if it were previously set consequent to the presence of a legal pulse, a pulse counter is advanced so as to increment the cumulative number of pulses counted so far. Thereafter, the "LEGAL" flag is reset and the micro-controller 25 awaits receipt of the next pulse of data.

On detection of a communications interrupt, bi-directional read-write communications may be effected between the data-gathering system 1 and the interrogation unit 2. At the start of the communications procedure, the baud rate of incoming data is measured and, according to the measured baud rate, a block of data transmitted from the interrogation unit 2 to the data-gathering system 1 is read. As explained above with reference to FIG. 3 of the drawings, when a meter reader desires to record or reprogram the data-gathering unit 1, he transmits an 8-byte signal via the interrogation unit 2 in accordance with a predetermined protocol. The 8-byte signal constitutes a single block of data and, on reading the transmitted block of data, the micro-controller 25 checks whether the communications protocol associated with the received block of data is valid. If, in fact, the protocol associated with the received block of data does not conform to the predetermined protocol programmed into the micro-controller 25, then all the flags are reset and the program branches to the RAM check instruction.

When a received block of data corresponds to the correct protocol, the micro-controller 25 carries out the instructions associated with the received block of data and responds accordingly to the interrogation unit 2.

It will be understood that the data-gathering system 1 and the interrogation unit 2 have been described functionally, since it will be apparent to those skilled in the art that there are many different ways in which suitable circuits can be constructed for use therein. Likewise, the burst-to-level conversion suggested with reference to FIGS. 5(a) and 5(b) may be varied as required, so long as the micro-controller 25 and the hand-held computer are programmed to accept the same protocol.

It will further be understood that, whilst the invention has been described with particular reference to a water meter, the system is equally well adapted for use with other types of utility meters such as, for example, gas and electricity meters.

Furthermore, the peripheral equipment coupled to the water meter within the data-gathering unit is provided by means of an add-on unit which may be replaced, if necessary, independently of the water meter itself. Likewise, a faulty water meter may be replaced without having to replace the peripheral equipment also. Consequently, the peripheral equipment may be completely sealed, being powered by a small internal battery whose shelf life is long on account of the low leakage current of the data-gathering unit when not in use.

In the preferred embodiment, connection between the hand-held computer and the data-gathering unit is effected locally by means of the mutual coupling between the antennae in the interface and the data-gathering unit. However, if required, the meter reading and programming may be effected remotely by coupling the data-gathering unit to a remote antenna via a coaxial cable.

Additionally, the interface may be connected to a remote computer via a suitable modem if local processing using a hand-held computer is not required.

The invention thus provides a system for measuring and recording a utility, for transmitting the recorded information to a local or remote computer via a suitable interface and, via the same interface, enabling the stored data to be modified, as required, by a meter reader or by the utility supply company.

I claim:

1. A system for measuring and recording a utility consumption, said system comprising a data-gathering system and an interrogation unit;

the data-gathering system including:
a meter having a unique identification code for measuring and displaying a metered utility consumption and producing successive electrical pulses representative of an increment thereof,
a sealed electronic module removably fixed to the meter and comprising:
a first computer electrically coupled to the meter and responsive to the electrical pulses produced thereby for computing a utility consumption,
a memory coupled to the first computer for storing data representative of said computed utility consumption and of said unique identification code,
a first bi-directional data converter coupled to the first computer for converting in one direction said data to a representative r.f. signal and for converting in the second direction an r.f. signal to representative digital data,
a first wideband coil antenna coupled to the data converter for transmitting and receiving an r.f. signal; and
a power source for providing electrical power to the sealed electronic module; and the interrogation unit including:
a non-contact portable communications interface for coupling the data-gathering system to a second computer so as to permit the second computer to read data stored in the memory of the data gathering unit and to write data thereto thereby allowing the computed utility consumption to be conformed to the metered utility consumption; said non-contact portable communications interface comprising:
a second wideband coil antenna for communicating with the first coil antenna by mutual coupling,
a second bi-directional data converter coupled to the second antenna for converting in one direction a received r.f. signal to digital output data and for converting in a second direction digital input data to an r.f. output signal and being further provided with coupling means for coupling to the second computer, and
a power source for providing electrical power to the interrogation unit.

2. The system according to claim 1, wherein the second computer is portable.

3. The system according to claim 1, wherein:
the coupling means in the second bi-directional data converter is a modem, and
the second computer is remotely coupled to the modem.

4. The system according to claim 1, wherein the first computer includes a micro-controller.

5. The system according to claim 4, wherein the first wideband antenna transmits and receives signals whose frequency exceeds a predetermined threshold only.

6. The system according to claim 5, wherein the predetermined frequency threshold is 30 KHz.

7. The system according to claim 4, wherein the first data converter resets the micro-controller in response to a first portion of an r.f. signal received by the first antenna and passes an instruction to the micro-controller in response to a subsequent portion of the r.f. signal.

8. The system according to claim 7, wherein the micro-controller is responsive to the instruction for passing digital data to the first data converter.

9. A system for measuring and recording a utility consumption, said system comprising a data-gathering system, a central access unit and an interrogation unit;

the data-gathering system including:
a meter having a unique identification code for measuring and displaying a metered utility consumption and producing successive electrical pulses representative of an increment thereof,
a sealed electronic module removably fixed to the meter and comprising:
a first computer electrically coupled to the meter and responsive to the electrical pulses produced thereby for computing a utility consumption,
a memory coupled to the first computer for storing data representative of said computed utility consumption and of said unique identification code,
a first bi-directional data converter coupled to the first computer for converting in one direction said data to a representative r.f. signal and for converting in the second direction an r.f. signal to representative digital data, and
a power source for providing electrical power to the sealed electronic module;

the central access unit comprising a first wideband coil antenna coupled to the data converter in the data gathering unit for transmitting and receiving an r.f. signal; and the interrogation unit including:
a non-contact portable communications interface for coupling the data-gathering system to a second computer so as to permit the second computer to read data stored in the memory of the data gathering unit and to write data thereto thereby allowing the computed utility consumption to be conformed to the metered utility consumption; said non-contact portable communications interface comprising:
a second wideband coil antenna for communicating with the first coil antenna by mutual coupling,
a second bi-directional data converter coupled to the second antenna for converting in one direction a received r.f. signal to digital output data and for converting in a second directional digital input data to an r.f. output signal and being further provided with coupling means for coupling to the second computer, and
a power source for providing electrical power to the interrogation unit.

10. The system according to claim 9, wherein:
the coupling means in the second bi-directional data converter is a modem, and
the second computer is remotely coupled to the modem.

11. The system according to claim 9, wherein the second computer is portable.

* * * * *